(12) United States Patent
Hamada (10) Patent No.: US 7,999,883 B2
(45) Date of Patent: Aug. 16, 2011

(54) DISPLAY

(75) Inventor: Shingo Hamada, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 289 days.

(21) Appl. No.: 12/266,258

(22) Filed: Nov. 6, 2008

(65) Prior Publication Data
US 2009/0122222 A1 May 14, 2009

(30) Foreign Application Priority Data

Nov. 8, 2007 (JP) ................................. 2007-291184

(51) Int. Cl.
*G02F 1/1333* (2006.01)
(52) U.S. Cl. ......................................................... 349/58
(58) Field of Classification Search ................... 349/40, 349/58–60
See application file for complete search history.

(56) References Cited

U.S. PATENT DOCUMENTS

| | | | |
|---|---|---|---|
| 5,808,707 A | 9/1998 | Niibori et al. | |
| 6,067,133 A | 5/2000 | Niibori et al. | |
| 6,462,794 B1 * | 10/2002 | Yoshikawa et al. | 349/95 |
| 6,876,150 B2 * | 4/2005 | Tanaka | 313/582 |
| 7,710,402 B2 * | 5/2010 | Takenaka et al. | 345/173 |
| 7,728,231 B2 * | 6/2010 | Matsui et al. | 174/252 |
| 7,812,891 B2 * | 10/2010 | Maruta | 348/794 |
| 2001/0030491 A1 | 10/2001 | Maruta | |
| 2005/0062899 A1 | 3/2005 | Fukayama et al. | |
| 2006/0254107 A1 * | 11/2006 | Watanabe | 40/768 |

FOREIGN PATENT DOCUMENTS

| | | |
|---|---|---|
| EP | 0 484 037 A2 | 5/1992 |
| JP | 9-73072 A | 3/1997 |
| JP | 9-247585 A | 9/1997 |
| JP | 10-271415 A | 10/1998 |
| JP | 2001-42295 A | 2/2001 |
| JP | 2005-91971 A | 4/2005 |

OTHER PUBLICATIONS

European Search Report dated Feb. 17, 2009 (six (6) pages).
European Examination Report dated Feb. 24, 2011 (Five (5) pages).

* cited by examiner

*Primary Examiner* — Mark A Robinson
*Assistant Examiner* — Eric Wong
(74) *Attorney, Agent, or Firm* — Crowell & Moring LLP (57) ABSTRACT

This display includes a display portion for displaying images and a housing mounted with a mounting portion of the display portion, while the housing is so formed as to warp in a recessed shape concaved rearward along the longitudinal direction in plan view, and so structured as to have a flat shape in plan view when the display portion is fixed.

17 Claims, 9 Drawing Sheets

FIG.9

DISPLAY

BACKGROUND OF THE INVENTION

1. Field of the Invention

The present invention relates to a display, and more particularly, it relates to a display comprising a housing and a display portion.

2. Description of the Background Art

A display comprising a housing and a display portion is known in general, as disclosed in each of Japanese Patent Laying-Open Nos. 9-73072 (1997), 2005-91971 and 2001-42295, for example.

The aforementioned Japanese Patent Laying-Open No. 9-73072 discloses a display comprising a liquid crystal panel (display portion) displaying images, a panel fixing plate (mounting portion) supporting the liquid crystal panel, a transparent display board arranged on the front side of the liquid crystal panel, a display board support member (mounting portion) for fixing the display board and an armor member (housing) having an opening for exposing the display board frontward. The display board of this display is held between the display board support member and the armor member. The armor member has such a U-shaped cross section in the longitudinal direction that both ends thereof are substantially perpendicularly bent rearward.

The aforementioned Japanese Patent Laying-Open No. 2005-91971 discloses a display comprising a liquid crystal panel (display portion) displaying images and an upper frame of a metal, mounted with the liquid crystal panel, having a window for exposing the liquid crystal panel frontward. In this display, a conductive rubber cushion is provided between the liquid crystal panel and the upper frame, for filling up a clearance between the liquid crystal panel and the upper frame. The upper frame has such a U-shaped cross section in the longitudinal direction that both ends thereof are substantially perpendicularly bent rearward.

The aforementioned Japanese Patent Laying-Open No. 2001-42295 discloses a liquid crystal display module comprising a liquid crystal panel (display portion) displaying images and a holder (housing) of resin, mounted with the liquid crystal panel, having an opening for exposing the liquid crystal panel outward. This holder has such a U-shaped cross section in the longitudinal direction that both ends thereof are substantially perpendicularly bent rearward.

When an impact is externally applied to the armor member of the display described in the aforementioned Japanese Patent Laying-Open No. 9-73072, however, the armor member may be deformed into a projecting shape protruding frontward along the longitudinal direction in plan view, due to the U-shaped cross section in the longitudinal direction with the both ends substantially perpendicularly bent rearward. In this case, a clearance is disadvantageously formed between a portion of the armor member around a central portion in the longitudinal direction and the liquid crystal panel.

In the display described in the aforementioned Japanese Patent Laying-Open No. 2005-91971, the conductive rubber cushion must be provided between the liquid crystal panel and the upper frame, so that no clearance is formed between the liquid crystal panel and the upper frame. Therefore, the number of components is disadvantageously increased due to the conductive cushion.

When an impact is externally applied to the holder of the liquid crystal display module described in the aforementioned Japanese Patent Laying-Open No. 2001-42295, the holder may be deformed into a projecting shape protruding frontward along the longitudinal direction in plan view, due to the U-shaped cross section in the longitudinal direction with the both ends substantially perpendicularly bent rearward. In this case, a clearance is disadvantageously formed between a portion of the holder around a central portion in the longitudinal direction and the liquid crystal panel.

SUMMARY OF THE INVENTION

The present invention has been proposed in order to solve the aforementioned problems, and an object of the present invention is to provide a display capable of suppressing formation of a clearance between a housing and a display portion resulting from deformation of the housing into a projecting shape protruding frontward in plan view while suppressing increase in the number of components.

A display according to a first aspect of the present invention comprises a display portion for displaying images and a housing mounted with a mounting portion of the display portion, while the housing is so formed as to warp in a recessed shape concaved rearward along the longitudinal direction in plan view, and so structured as to have a flat shape in plan view when the display portion is fixed.

In the display according to the first aspect of the present invention, as hereinabove described, the housing is so formed as to warp in the recessed shape concaved rearward along the longitudinal direction in plan view and so structured as to have the flat shape in plan view when the display portion is fixed. Even if the longitudinal section of the housing has such a shape, easily projectingly deformed in plan view, that both ends thereof are substantially perpendicularly bent rearward, therefore, the housing, deformed into the flat shape after the same is so formed as to warp in the recessed shape concaved rearward along the longitudinal direction in plan view, can be inhibited from deformation into a projecting shape protruding frontward along the longitudinal direction in plan view in formation of the housing or upon external application of an impact to the housing. Further, the housing can be so inhibited from deformation into a projecting shape protruding frontward along the longitudinal direction in plan view that no additional component may be separately provided for filling up a clearance formed between the housing and the display portion. Thus, increase in the number of components can be suppressed. Consequently, formation of a clearance between the housing and the display portion resulting from deformation of the housing into a projecting shape protruding frontward in plan view can be suppressed while suppressing increase in the number of components.

In the aforementioned display according to the first aspect, the housing preferably includes boss portions coming into contact with the mounting portion of the display portion for mounting the display portion on the housing at least one by one on both end portions and a central portion of the housing in the longitudinal direction, and the protrusive heights of the boss portions of the housing are preferably substantially equalized to each other. According to this structure, contact surfaces of all boss portions coming into contact with the mounting portion can be located on substantially identical vertical positions when the display portion is fixed to the housing and the housing is deformed into the flat shape. Thus, the flat shape of the housing can be stably maintained when the display portion is fixed to the housing.

In this case, the boss portions of the housing preferably have threaded holes, the display portion is preferably fixed to the housing by fitting screw members into the threaded holes of the boss portions of the housing through the mounting portion, and the housing is preferably deformed into the flat shape in plan view from the state warping in the recessed shape in plan view when the display portion is fixed to the housing by the screw members. According to this structure, the display portion can be fixed to the housing deformed into the flat shape in plan view from the state warping in the recessed shape concaved rearward along the longitudinal direction through the screw members, whereby the flat shape of the housing can be more stably maintained when the display portion is fixed to the housing.

In the aforementioned display according to the first aspect, the housing is preferably made of resin, and so formed by resin molding as to warp in the recessed shape concaved rearward along the longitudinal direction in plan view. According to this structure, the housing can be inhibited from deformation into a projecting shape protruding frontward in plan view in resin molding, whereby the housing may not be deformed into a flat shape in plan view or a recessed shape concaved rearward in plan view when the display portion is fixed to the housing so that no clearance is formed between the housing and the display portion. Thus, the operation of fixing the display portion to the housing can be simplified. Further, the housing is so formed by resin molding as to warp in the recessed shape concaved rearward along the longitudinal direction in plan view, whereby the housing having the recessed shape concaved rearward along the longitudinal direction can be easily formed.

In this case, the mounting portion of the display portion is preferably made of a metal, and so formed that the housing of resin is deformed into the flat shape from the state warping in the recessed shape concaved rearward while the metallic mounting portion of the display portion remains undeformed when the metallic mounting portion of the display portion is fixed to the housing of resin. According to this structure, the mounting portion of the display portion is so made of the metal having higher rigidity than the resin that the same can be inhibited from deformation into a recessed shape concaved rearward in plan view due to repulsive force of the housing returning from the flat shape to the recessed shape concaved rearward in plan view when the display portion is fixed to the housing. Thus, the flat shape of the housing can be more stably maintained when the display portion is fixed to the housing.

In the aforementioned display according to the first aspect, the housing may include an opening for exposing the display portion frontward and a protrusion so provided along the opening as to protrude rearward with respect to the display portion, and the protrusion of the housing may be so formed as to separate from the mounting portion of the display portion when the display portion is fixed to the housing.

In the aforementioned display according to the first aspect, the housing is preferably so formed as to warp in the recessed shape concaved rearward along the horizontal direction in plan view, and so structured as to have the flat shape in plan view when the display portion is fixed. According to this structure, a display having a horizontally long housing capable of maintaining a flat shape can be obtained.

In the aforementioned display provided with the housing having the boss portions, the boss portions of the housing are preferably provided at least one by one on the both end portions and the central portion of the housing in the longitudinal direction and also provided at least one by one on both end portions and a central portion of the housing in the short-side direction, and all boss portions provided on the housing are preferably so formed as to have substantially identical protrusive heights. According to this structure, contact surfaces of all boss portions coming into contact with the mounting portion can be located on substantially identical vertical positions when the display portion is fixed to the housing and the housing is deformed into the flat shape. Thus, the flat shape of the housing can be more stably maintained when the display portion is fixed to the housing.

A liquid crystal television set according to a second aspect of the present invention comprises a display portion for displaying images and a housing mounted with a mounting portion of the display portion, while the housing is so formed as to warp in a recessed shape concaved rearward along the longitudinal direction in plan view, and so structured as to have a flat shape in plan view when the display portion is fixed.

In the liquid crystal television set according to the second aspect, as hereinabove described, the housing is so formed as to warp in the recessed shape concaved rearward along the longitudinal direction in plan view and so structured as to have a flat shape in plan view when the display portion is fixed. Even if the housing has such a U-shaped cross section in the longitudinal direction, easily projectingly deformed in plan view, that both ends thereof are substantially perpendicularly bent rearward, therefore, the housing, deformed into the flat shape after the same is so formed as to warp in the recessed shape concaved rearward along the longitudinal direction in plan view, can be inhibited from deformation into a projecting shape protruding frontward in plan view in formation of the housing or upon external application of an impact to the housing. Further, the housing can be so inhibited from deformation into a projecting shape protruding frontward along the longitudinal direction in plan view that no additional component may be separately provided for filling up a clearance formed between the housing and the display portion. Thus, increase in the number of components can be suppressed. Consequently, formation of a clearance between the housing and the display portion resulting from deformation of the housing into a projecting shape protruding frontward in plan view can be suppressed while suppressing increase in the number of components of the liquid crystal television set.

A method of manufacturing a display according to a third aspect of the present invention comprises steps of forming a housing mounted with a mounting portion of a display portion displaying images to warp in a recessed shape concaved rearward along the longitudinal direction in plan view and fixing the display portion to the housing so that the housing has a flat shape in plan view.

The method of manufacturing a display according to the third aspect comprises the steps of forming the housing to warp in the recessed shape concaved rearward along the longitudinal direction in plan view and fixing the display portion to the housing so that the housing has the flat shape in plan view. Even if the housing has such a U-shaped cross section in the longitudinal direction, easily projectingly deformed in plan view, that both ends thereof are substantially perpendicularly bent rearward, therefore, the housing, deformed into the flat shape after the same is so formed as to warp in the recessed shape concaved rearward along the longitudinal direction in plan view, can be inhibited from deformation into a projecting shape protruding frontward along the longitudinal direction in plan view in formation of the housing or upon external application of an impact to the housing.

In the aforementioned method of manufacturing a display according to the third aspect, the housing preferably includes boss portions coming into contact with the mounting portion of the display portion for mounting the display portion on the housing at least one by one on both end portions and a central portion of the housing in the longitudinal direction, and the protrusive heights of the boss portions of the housing are preferably substantially equalized to each other. According to this structure, contact surfaces of all boss portions coming into contact with the mounting portion can be located on substantially identical vertical positions when the display portion is fixed to the housing and the housing is deformed into the flat shape. Thus, the flat shape of the housing can be stably maintained when the display portion is fixed to the housing.

In this case, the boss portions of the housing preferably have threaded holes, and the step of fixing the display portion to the housing preferably includes a step of deforming the housing into the flat shape in plan view from the state warping in the recessed shape concaved rearward by fitting screw members into the threaded holes of the boss portions of the housing through the mounting portion. According to this structure, the display portion can be fixed to the housing deformed into the flat shape in plan view from the state warping in the recessed shape concaved rearward through the step of fixing the display portion to the housing with the screw members, whereby the flat shape of the housing can be more stably maintained through the step of fixing the display portion to the housing by fitting the screw members into the threaded holes of the boss portions of the housing.

In the aforementioned method of manufacturing a display according to the third aspect, the step of forming the housing preferably includes a step of forming the housing made of resin by resin molding to warp in the recessed shape along the longitudinal direction in plan view. According to this structure, the housing can be inhibited from deformation into a projecting shape protruding frontward in plan view in resin molding, whereby the housing may not be deformed into a flat shape in plan view or a recessed shape concaved rearward along the longitudinal direction when the display portion is fixed to the housing so that no clearance is formed between the housing and the display portion. Thus, the operation of fixing the display portion to the housing can be simplified. Further, the housing is so formed by resin molding as to warp in the recessed shape concaved rearward along the longitudinal direction in plan view, whereby the step of forming the housing to warp in the recessed shape concaved rearward along the longitudinal direction in plan view can be simplified.

In this case, the mounting portion of the display portion is preferably made of a metal, and the step of fixing the display portion to the housing preferably includes a step of fixing the display portion to the housing so that the housing of resin is deformed into the flat shape in plan view from the state warping in the recessed shape concaved rearward without deforming the metallic mounting portion of the display portion. According to this structure, the mounting portion of the display portion is so made of the metal having higher rigidity than the resin that the same can be inhibited from deformation into the recessed shape concaved rearward in plan view due to repulsive force of the housing returning from the flat shape to the recessed shape concaved rearward in plan view after the step of fixing the display portion to the housing. Thus, the flat shape of the housing can be more stably maintained after the step of fixing the display portion to the housing.

In the aforementioned method of manufacturing a display according to the third aspect, the housing may include an opening for exposing the display portion frontward and a protrusion so provided along the opening as to protrude rearward with respect to the display portion, and the step of fixing the display portion to the housing may include a step of fixing the display portion to the housing so that the protrusion of the housing and the mounting portion of the display portion separate from each other.

In the aforementioned method of manufacturing a display according to the third aspect, the step of forming the housing preferably includes a step of forming the housing to warp in the recessed shape concaved rearward along the horizontal direction in plan view. According to this structure, a display having a horizontally long housing capable of maintaining a flat shape can be obtained.

In the aforementioned method of manufacturing a display provided with the housing including the boss portions, the housing preferably includes boss portions coming into contact with the mounting portion of the display portion for mounting the display portion on the housing at least one by one on both end portions and a central portion of the housing in the longitudinal direction, and the protrusive heights of the boss portions of the housing are preferably substantially equalized to each other. According to this structure, contact surfaces of all boss portions coming into contact with the mounting portion can be located on substantially identical vertical positions when the display portion is fixed to the housing and the housing is deformed into the flat shape. Thus, the flat shape of the housing can be more stably maintained when the display portion is fixed to the housing.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the accompanying drawings.

The structure of a liquid crystal television set 1 according to the embodiment of the present invention is described with reference to FIGS. 1 to 8. This embodiment of the present invention is applied to the liquid crystal television set 1, which is an exemplary display.

Figure 1:
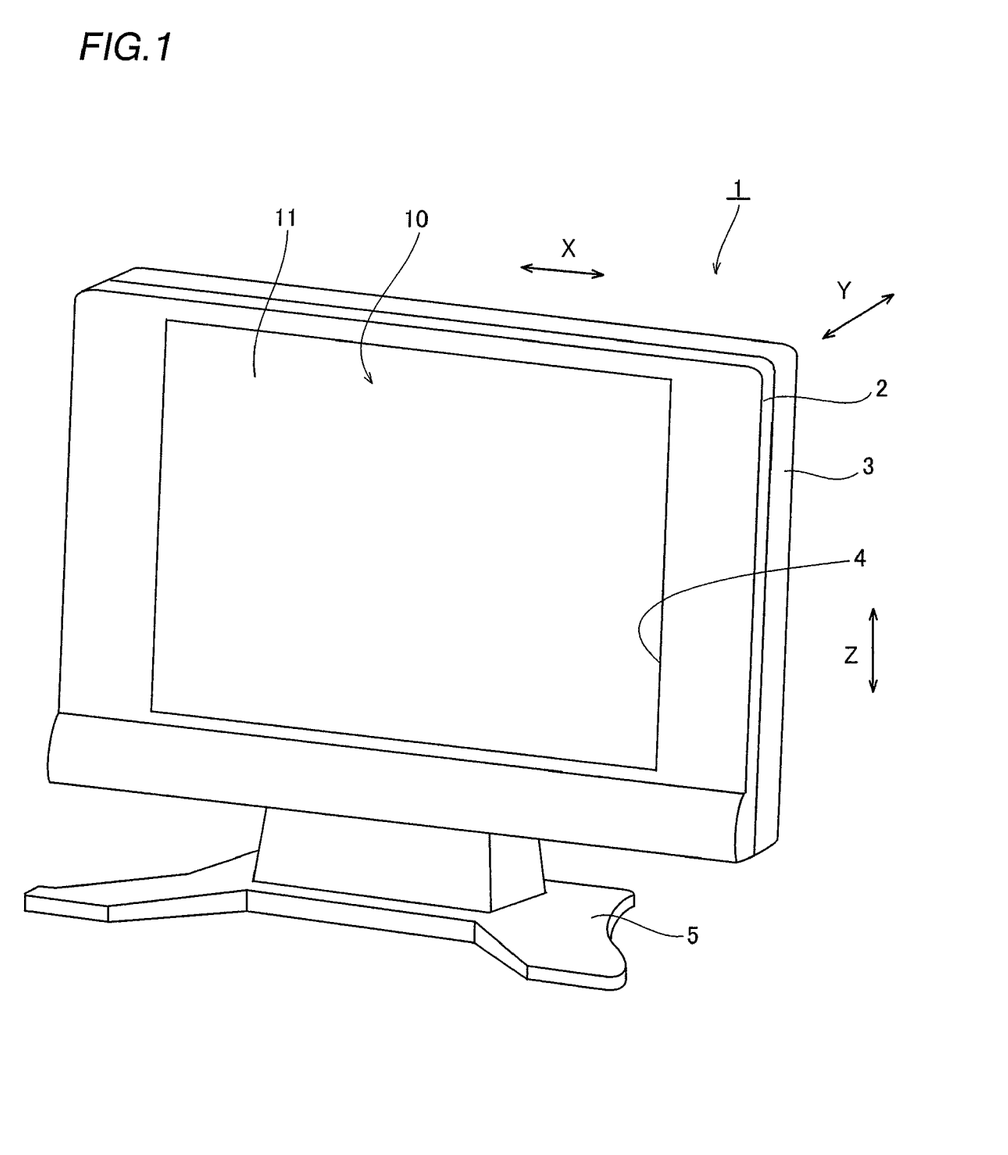
FIG. 1 is a perspective view showing the overall structure of a liquid crystal television set according to an embodiment of the present invention.

The liquid crystal television set 1 according to the embodiment of the present invention comprises a liquid crystal module 10 including a liquid crystal panel 11 for displaying images, as shown in FIG. 1. The liquid crystal panel 11 is supported by a front housing 2 of resin and a rear housing 3. The front housing 2 is provided with an opening 4 for exposing the liquid crystal panel 11 frontward. The liquid crystal module 10 is an example of the "display portion" in the present invention, and the front housing 2 is an example of the "housing" in the present invention. A leg portion 5 is provided under the front and rear housings 2 and 3.

Figure 2:
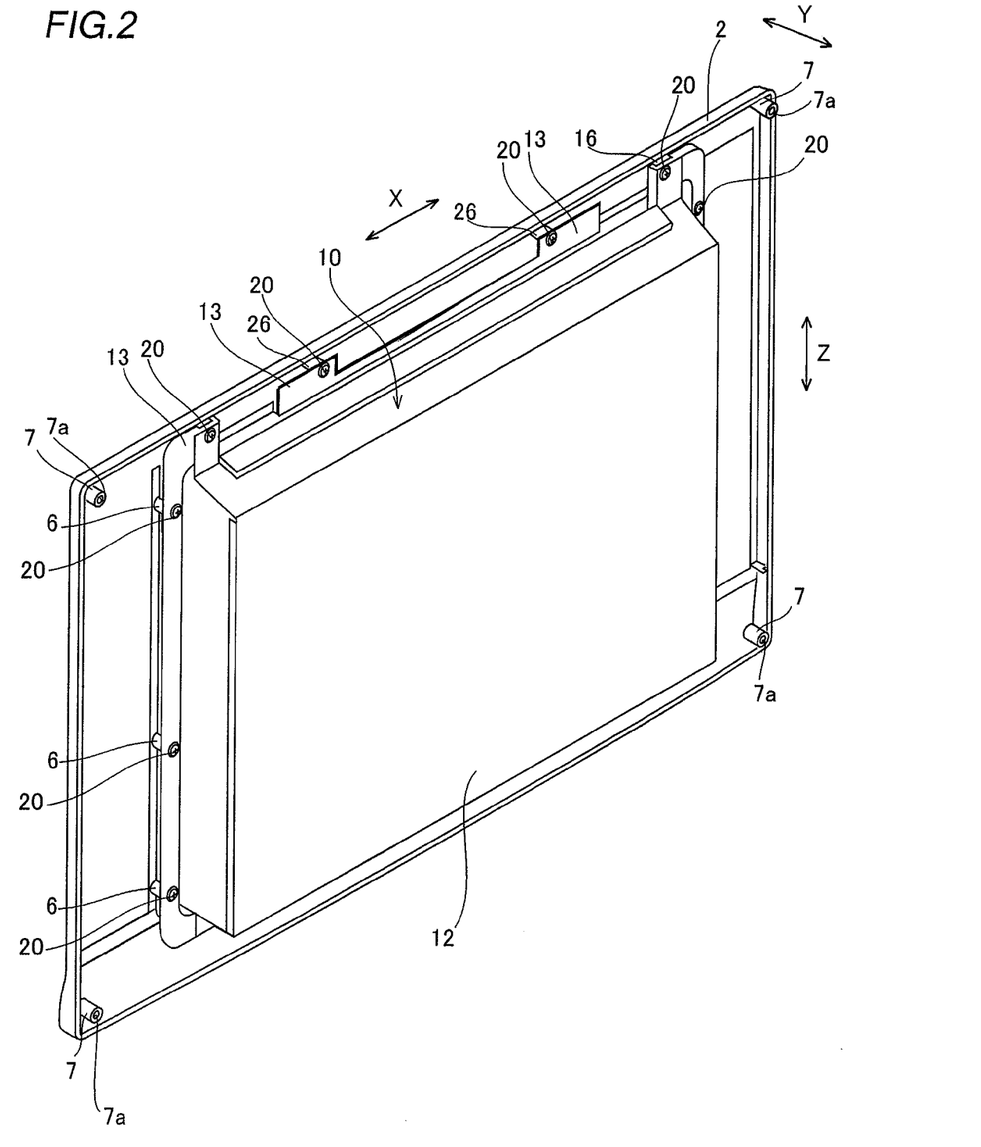
FIG. 2 is a perspective view for illustrating a mounting structure of a liquid crystal module of the liquid crystal television set according to the embodiment of the present invention shown in FIG. 1.
Figure 3:
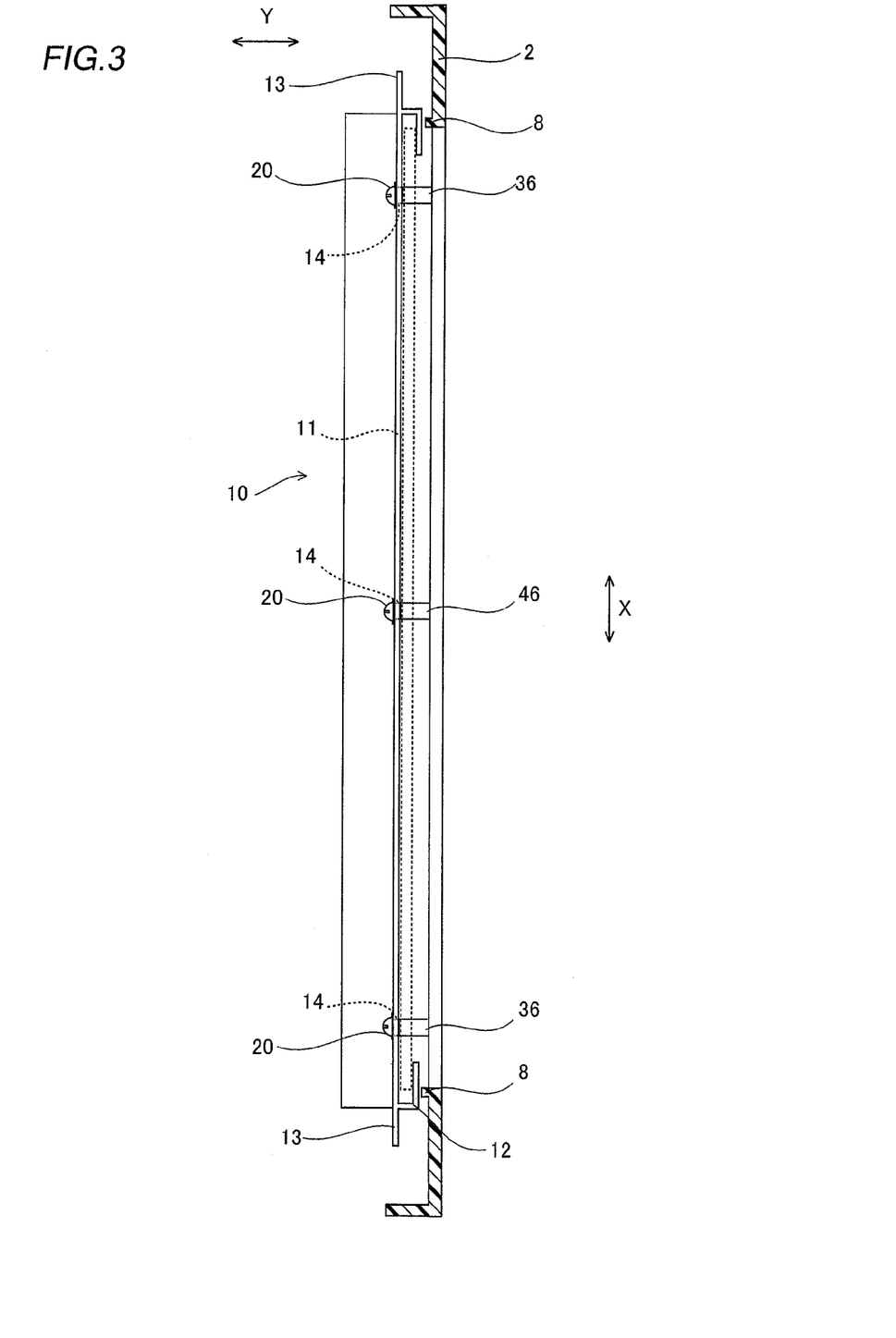
FIG. 3 is a diagram for illustrating a mounting state between a lower portion of a front housing and the liquid crystal module in the liquid crystal television set according to the embodiment of the present invention shown in FIG. 1.
Figure 4:
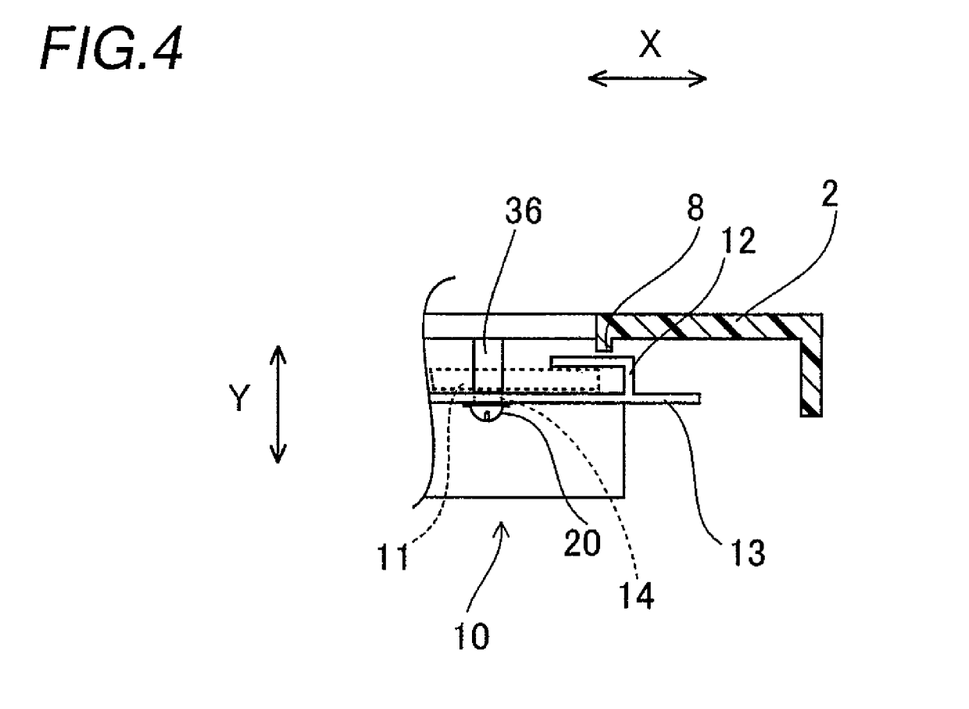
FIG. 4 is a partially enlarged view for illustrating the mounting state between the lower portion of the front housing and the liquid crystal module in the liquid crystal television set according to the embodiment of the present invention shown in FIG. 3.
Figure 5:
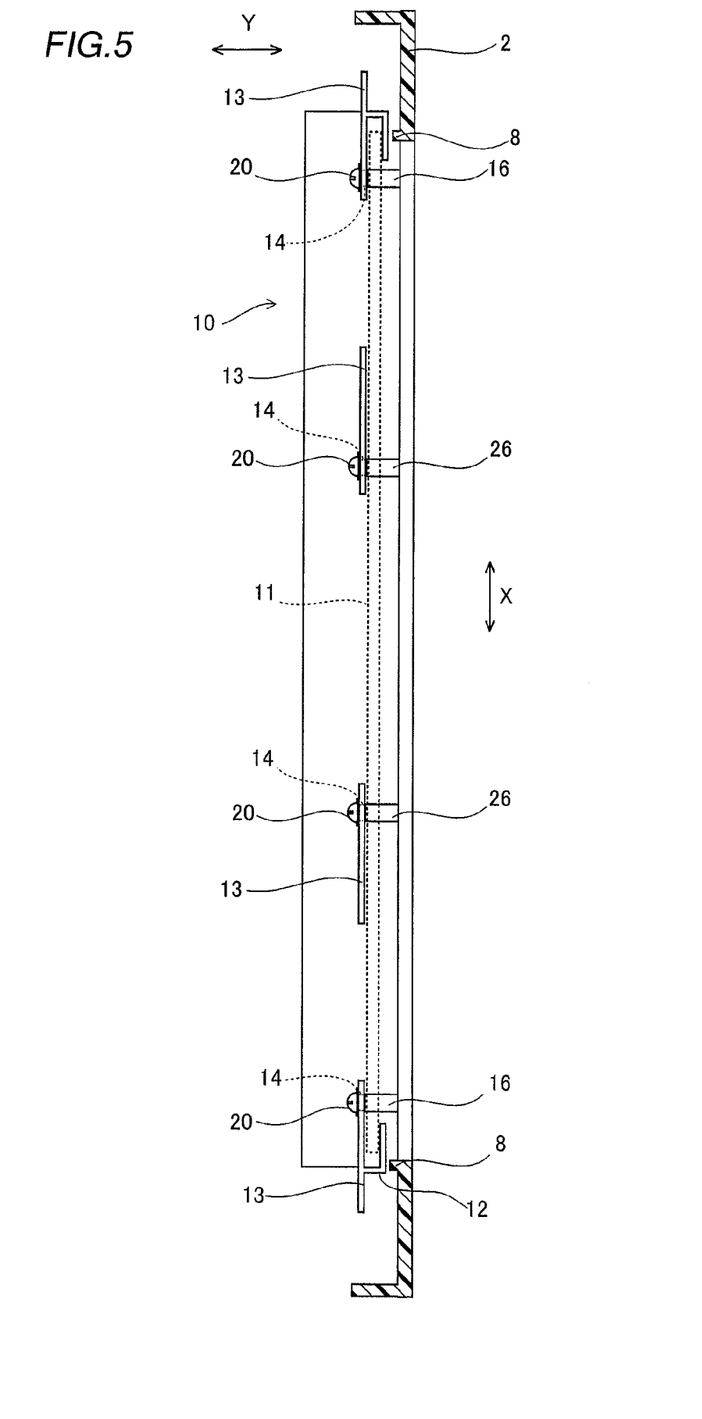
FIG. 5 is a diagram for illustrating a mounting state between an upper portion of the front housing and the liquid crystal module in the liquid crystal television set according to the embodiment of the present invention shown in FIG. 1.

As shown in FIG. 2, the front housing 2 has such a U-shaped cross section in the longitudinal direction that both ends thereof are substantially perpendicularly bent rearward. In other words, the front housing 2 is so formed that ends in the vertical direction (direction Z) and the horizontal direction (direction X) protrude rearward (direction Y). The liquid crystal module 10 is mounted on the back surface of the front housing 2. This liquid crystal module 10 includes a chassis 12 of a metal including the liquid crystal panel 11 (see FIG. 1) therein. The metallic chassis 12 has a mounting portion 13 on an outer edge thereof. The mounting portion 13 has screw receiving holes 14 (see FIGS. 3 and 5). As shown in FIGS. 3 to 5, the mounting portion 13 is fixed by screws 20 in a state coming into contact with bosses 6, 16, 26, 36 and 46 so provided as to protrude from the front housing 2 rearward (in the direction Y). The chassis 12 is made of a metal having higher rigidity than the front housing 2 of resin. The bosses 6, 16, 26, 36 and 46 are examples of the "boss portions" in the present invention. The screws 20 are examples of the "screw members" in the present invention.

Figure 6:
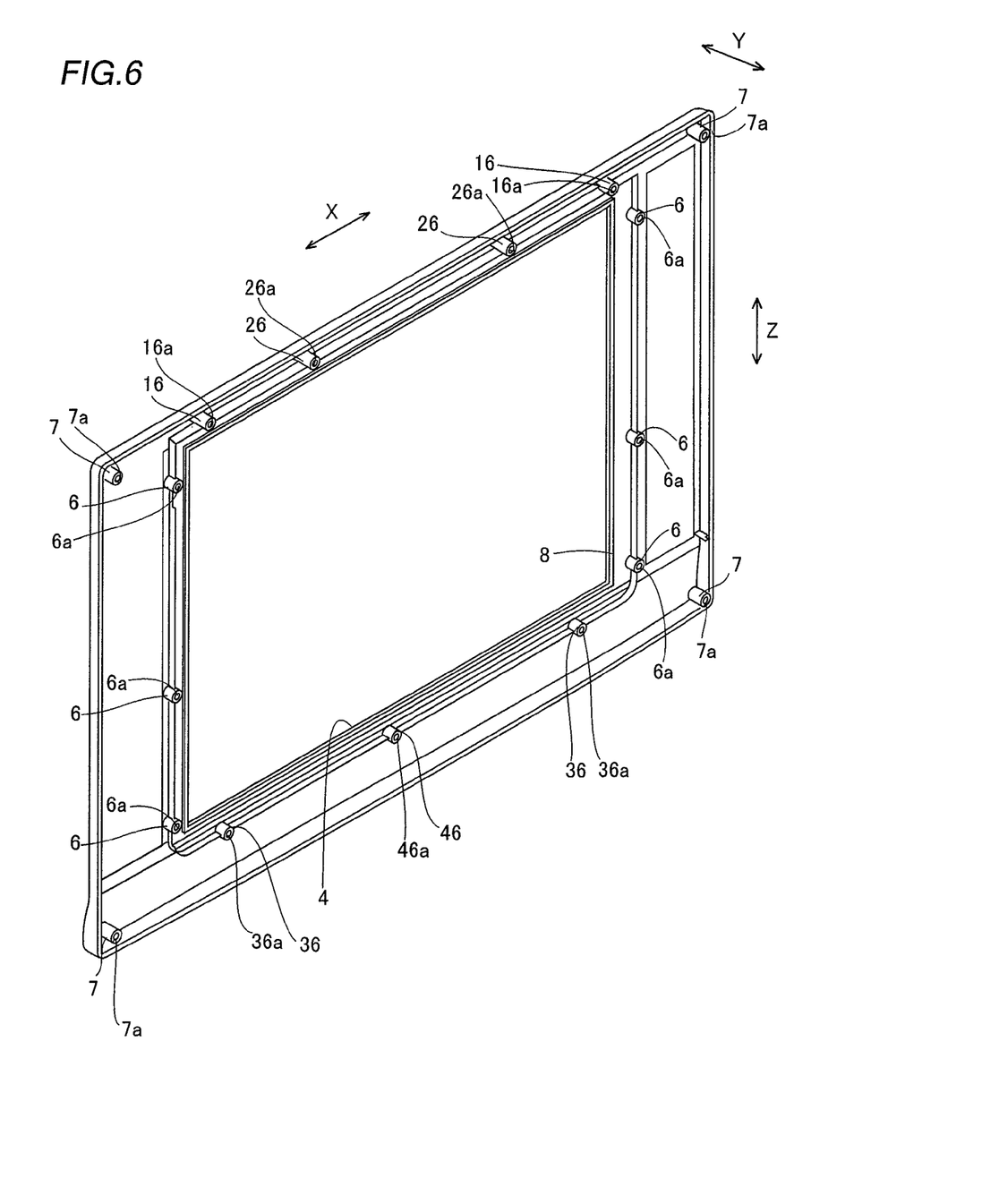
FIG. 6 is a perspective view for illustrating the structure of the front housing of the liquid crystal television set according to the embodiment of the present invention shown in FIG. 1.

According to this embodiment, the bosses 6 are arranged on both sides of the opening 4 in the horizontal direction (direction X) one by one in the vicinity of both ends and central portions in the vertical direction (direction Z), as shown in FIG. 6. On the upper side of the opening 4 of the front housing 2, the bosses 16 are provided in the vicinity of both ends of the opening 4 in the horizontal direction (direction X) respectively, while the two bosses 26 are provided on portions closer to the central portion of the opening 4 at a prescribed interval. On the lower side of the opening 4 of the front housing 2, the bosses 36 are provided in the vicinity of both ends of the opening 4 in the horizontal direction (direction X) respectively, and the single boss 46 is provided in the vicinity of the central portion of the opening 4. All bosses 6, 16, 26, 36 and 46 of the front housing 2 are so formed as to have the same protrusive heights. Further, the bosses 6, 16, 26, 36 and 46 have threaded holes 6a, 16a, 26a, 36a and 46a respectively. The threaded holes 6a, 16a, 26a, 36a and 46a are examples of the "threaded holes" in the present invention. These threaded holes 6a, 16a, 26a, 36a and 46a are provided for mounting the liquid crystal module 10 (see FIG. 2) on the front housing 2. In other words, the liquid crystal module 10 is fixed to the front housing 2 by bringing the mounting portion 13 of the liquid crystal module 10 into contact with the bosses 6, 16, 26, 36 and 46 of the front housing 2, inserting the screws 20 into the screw receiving holes 14 (see FIG. 4) of the mounting portion 13 and fitting the same into the threaded holes 6a, 16a, 26a, 36a and 46a of the bosses 6, 16, 26, 36 and 46, as shown in FIGS. 2 to 5.

As shown in FIG. 2, the front housing 2 is provided with bosses 7 having threaded holes 7a for mounting the rear housing 3 (see FIG. 1) in the vicinity of corners in the vertical direction (direction Z) and the horizontal direction (direction X). The front housing 2 and the rear housing 3 (see FIG. 1) are fixed by fitting screws (not shown) into the threaded holes 7a provided on the bosses 7. The front housing 2 includes protrusions 8 so provided along edges of the opening 4 as to protrude rearward (in the direction Y). The protrusions 8 are so formed as not to come into contact with the chassis 12 of the liquid crystal module 10 when the liquid crystal module 10 is mounted on the front housing 2, as shown in FIGS. 3 to 5.

Figure 7:
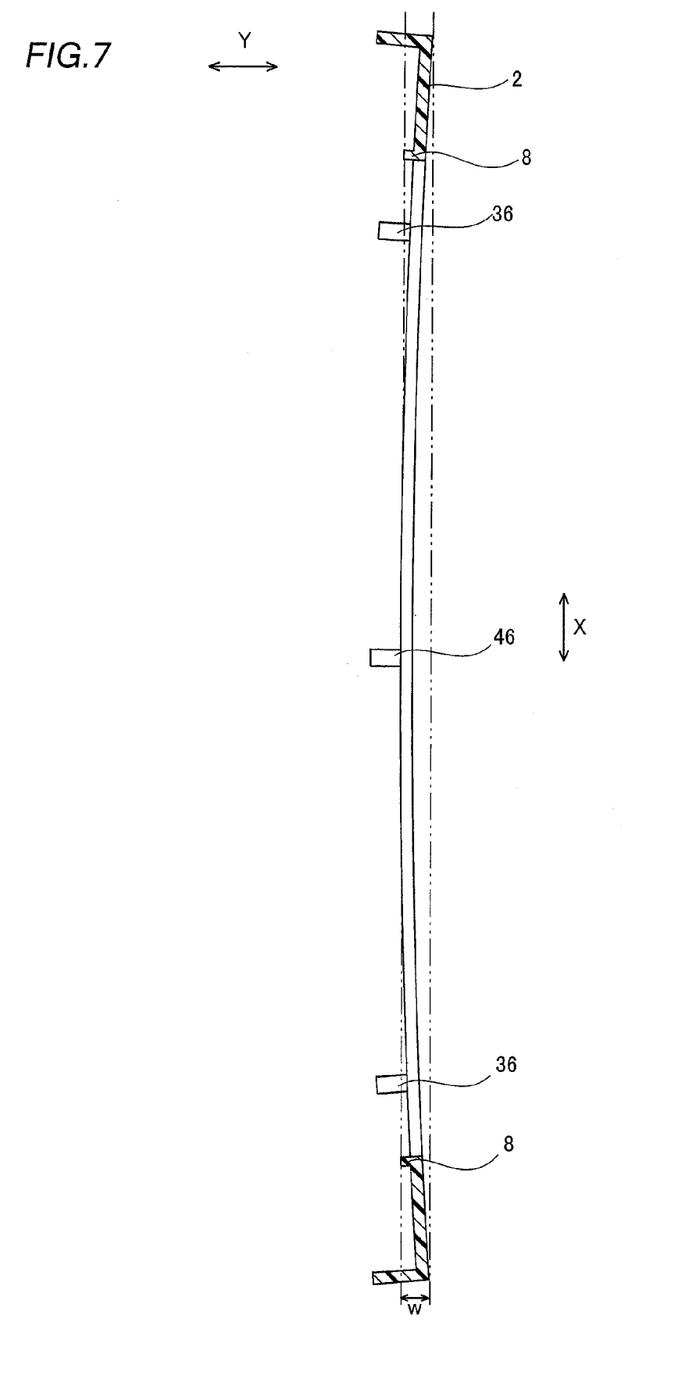
FIG. 7 is a sectional view for illustrating the structure of the front housing of the liquid crystal television set according to the embodiment of the present invention shown in FIG. 1.

According to this embodiment, the front housing 2 is so formed by resin molding as to warp in a recessed shape concaved rearward along the horizontal direction (direction X), i.e., the longitudinal direction, in plan view, as shown in FIG. 7. The width w of this warping is about 0.5 mm. The lower side of the front housing 2 warping in the horizontal direction (direction X) is flattened when the mounting portion 13 of the liquid crystal module 10 is mounted on the bosses 36 and 46 of the front housing 2 by the screws 20, as shown in FIG. 3. Further, the upper side of the front housing 2 is flattened when the mounting portion 13 of the liquid crystal module 10 is mounted on the bosses 16 and 26 of the front housing 2 by the screws 20, as shown in FIG. 5.

The procedure of mounting the liquid crystal module 10 on the front housing 2 of the liquid crystal television set 1 according to the embodiment of the present invention is now described with reference to FIGS. 3 to 5, 8 and 9.

Figure 8:
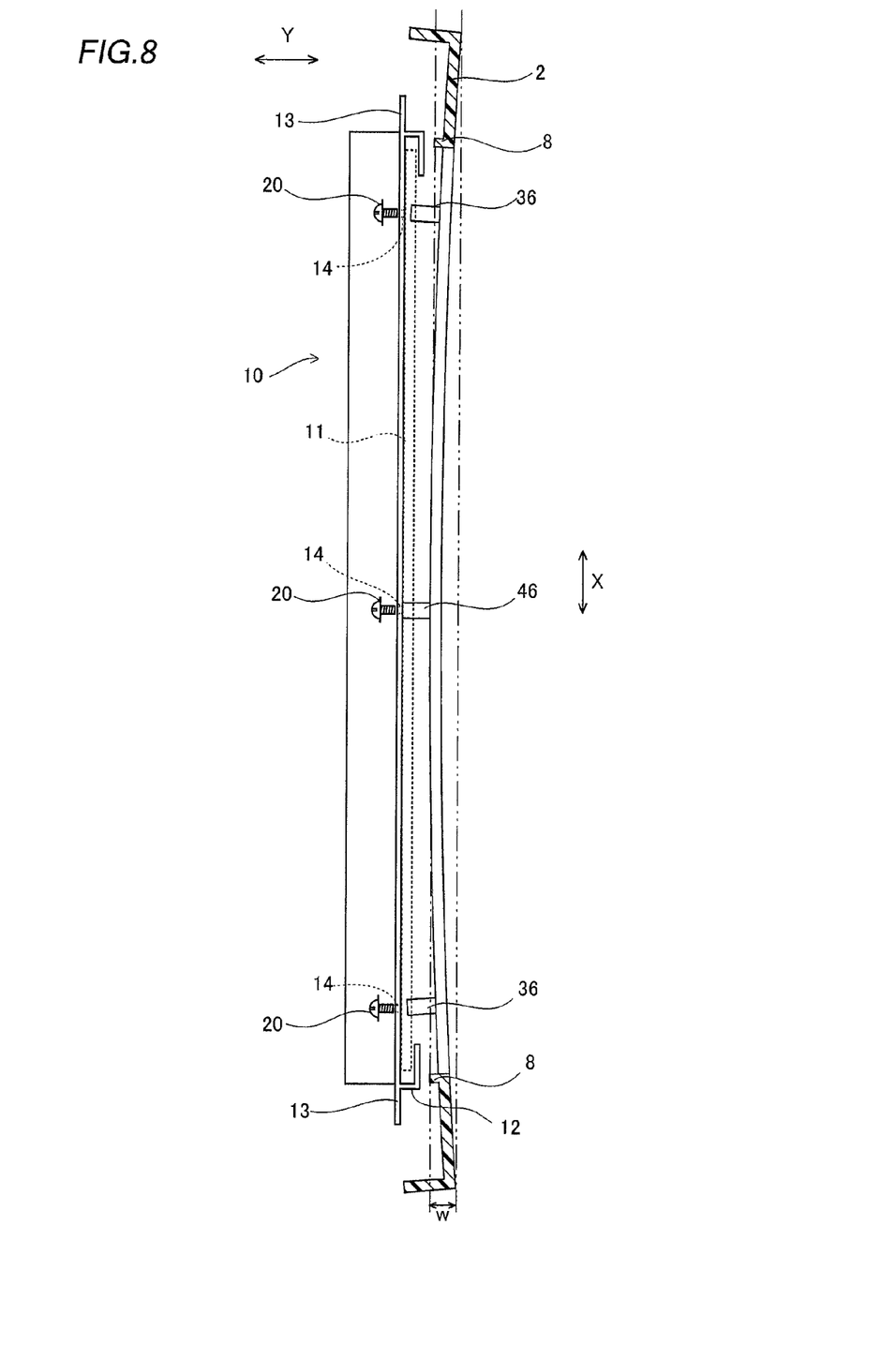
FIG. 8 is a diagram for illustrating a method of mounting the lower portion of the front housing and the liquid crystal module in the liquid crystal television set according to the embodiment of the present invention shown in FIG. 1.

In the two bosses 36 and the boss 46 provided in the vicinity of both ends and the central portion of the lower side of the opening 4 of the front housing 2, the central boss 46 is first brought into contact with the mounting portion 13 before the liquid crystal module 10 is mounted on the front housing 2, as shown in FIG. 8. Thus, the two bosses 36 separate from the mounting portion 13 of the chassis 12. This is because the front housing 2 is so formed as to warp in the recessed shape concaved rearward along the horizontal direction (direction X), i.e., the longitudinal direction, in plan view before the chassis 12 of the liquid crystal module 10 is mounted on the front housing 2 while all bosses 36 and 46 are formed in the same protrusive heights. Then, the screws 20 are inserted into the screw receiving holes 14 of the mounting portion 13 of the liquid crystal module 10 and fitted into the threaded holes 36a and 46a of the bosses 36 and 46 respectively. Thus, the liquid crystal module 10 is mounted on the front housing 2, as shown in FIG. 4. At this time, the front housing 2 is deformed into a flat shape from the state warping in the recessed shape concaved rearward in plan view, and fixed in a state maintaining the flat shape.

Figure 9:
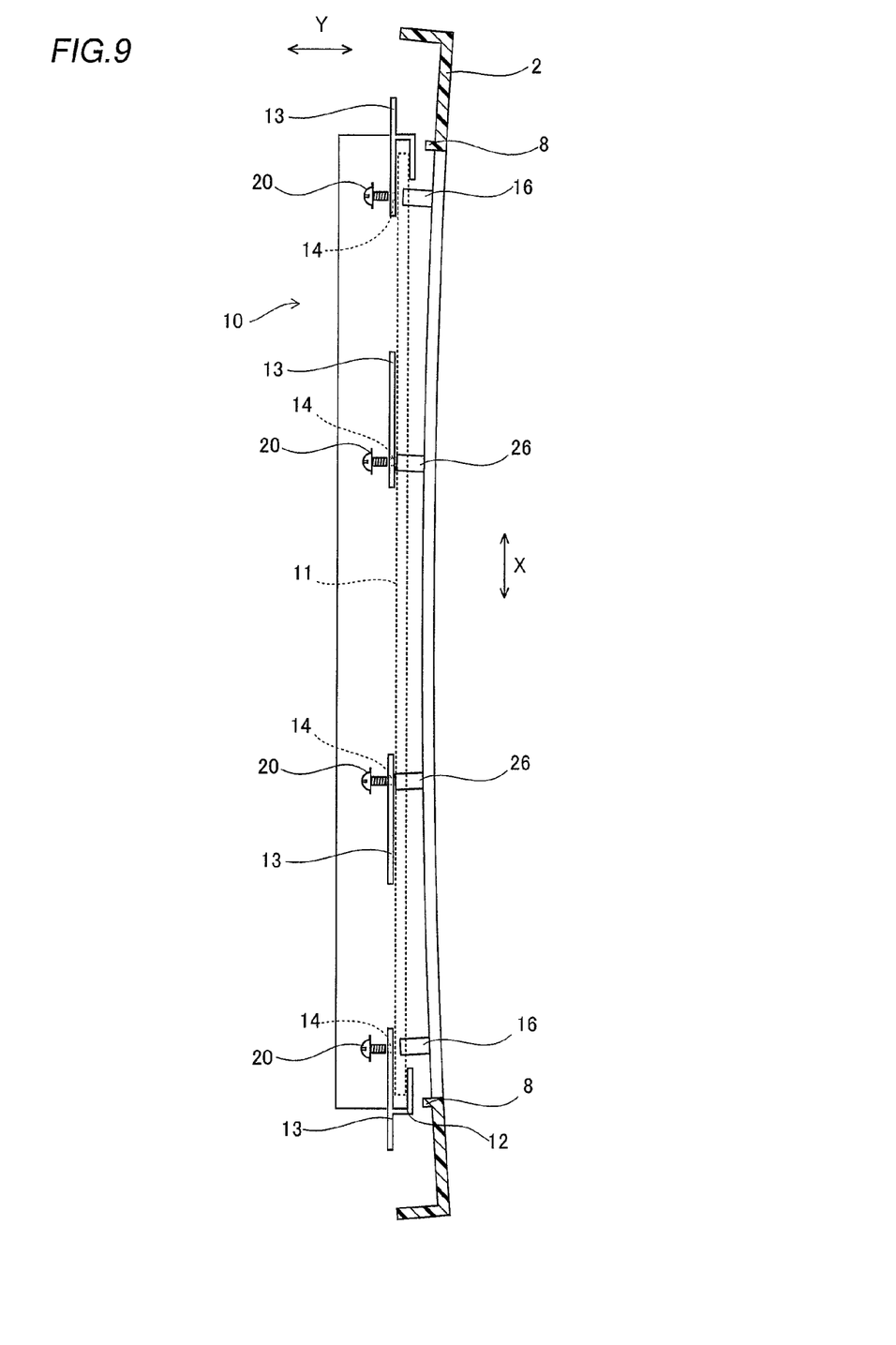
FIG. 9 is a diagram for illustrating a method of mounting the upper portion of the front housing and the liquid crystal module in the liquid crystal television set according to the embodiment of the present invention shown in FIG. 1.

All of the two bosses 16 and the two bosses 26 provided in the vicinity of both ends and the central portion of the upper side of the opening 4 of the front housing 2 are so formed as to have the same protrusive heights before the liquid crystal module 10 is mounted on the front housing 2, as shown in FIG. 9. Further, the front housing 2 is so formed as to warp in the recessed shape concaved rearward along the horizontal direction (direction X), i.e., the longitudinal direction, in plan view. Therefore, all bosses 16 and 26 separate from the mounting portion 13 of the liquid crystal module 10. Then, the screws 20 are inserted into the screw receiving holes 14 of the mounting portion 13 of the liquid crystal module 10, and fitted into the threaded holes 16a and 26a of the bosses 16 and 26 respectively. Thus, the liquid crystal module 10 is mounted on the front housing 2, as shown in FIG. 6. At this time, the front housing 2 is deformed into the flat shape from the state warping in the recessed shape concaved rearward in plan view, and fixed in the state maintaining the flat shape. The flat shape of the front housing 2 is maintained while the mounting portion 13 of the liquid crystal module 10, made of the metal having higher rigidity than the resin forming the front housing 2, remains undeformed.

According to this embodiment, as hereinabove described, the front housing 2 is so formed as to warp in the recessed shape concaved rearward along the horizontal direction (direction X), i.e., the longitudinal direction, in plan view and so structured as to have the flat shape in plan view when the liquid crystal module 10 is fixed. Despite the U-shaped cross section, easily projectingly deformed in plan view, of the front housing 2 in the horizontal direction with both ends substantially perpendicularly bent rearward, therefore, the front housing 2, deformed into the flat shape after the same is so formed as to warp in the recessed shape concaved rearward in plan view, can be inhibited from deformation into a projecting shape protruding frontward in plan view in formation of the front housing 2 or upon external application of an impact to the front housing 2. Further, the front housing 2 can be so inhibited from deformation into a projecting shape protruding frontward that no additional component may be separately provided for filling up a clearance formed between the front housing 2 and the liquid crystal panel 11. Thus, increase in the number of components can be suppressed. Consequently, formation of a clearance between the front housing 2 and the liquid crystal panel 11 resulting from deformation of the front housing 2 into a projecting shape protruding frontward in plan view can be suppressed while suppressing increase in the number of components.

According to this embodiment, as hereinabove described, the bosses 6, 16, 26, 36 and 46 coming into contact with the mounting portion 13 of the liquid crystal module 10 for mounting the liquid crystal module 10 on the front housing 2 are provided at least one by one on both ends and the central portions to have the same protrusive heights. Therefore, contact surfaces of all bosses 6, 16, 26, 36 and 46 coming into contact with the mounting portion 13 can be located on substantially identical vertical positions to be flush with each other when the liquid crystal module 10 is fixed to the front housing 2 and the front housing 2 is deformed into the flat shape. Consequently, the flat shape of the front housing 2 can be stably maintained when the liquid crystal module 10 is fixed to the front housing 2.

According to this embodiment, as hereinabove described, the bosses 6, 16, 26, 36 and 46 of the front housing 2 have the screw holes 6a, 16a, 26a, 36a and 46a, the liquid crystal module 10 is fixed to the front housing 2 by fitting the screws 20 into the threaded holes 6a, 16a, 26a, 36a and 46a of the bosses 6, 16, 26, 36 and 46 of the front housing 2, and the front housing 2 is deformed into the flat shape in plan view from the state warping in the recessed shape concaved rearward along the horizontal direction when the liquid crystal module 10 is fixed thereto with the screws 20. Thus, the liquid crystal module 10 is fixed to the front housing 2 with the screws 20 and the front housing 2 is deformed into the flat shape in plan view from the state warping in the recessed shape concaved rearward, whereby the flat shape of the front housing 2 can be more stably maintained when the liquid crystal module 10 is fixed to the front housing 2.

According to this embodiment, as hereinabove described, the front housing 2 is so formed by resin molding as to warp in the recessed shape concaved rearward along the horizontal direction (direction X), i.e., the longitudinal direction, in plan view so that the same can be inhibited from deformation into a projecting shape protruding frontward along the horizontal direction (direction X) in plan view in resin molding, whereby the front housing 2 may not be deformed into a flat shape in plan view or a recessed shape concaved rearward along the horizontal direction when the liquid crystal module 10 is fixed to the front housing 2 so that no clearance is formed between the front housing 2 and the liquid crystal module 10. Thus, the operation of fixing the liquid crystal module 10 to the front housing 2 can be simplified. Further, the front housing 2 is so formed by resin molding as to warp in the recessed shape concaved rearward along the horizontal direction (direction X), i.e., the longitudinal direction, in plan view, whereby the front housing 2 of the recessed shape concaved rearward can be easily formed.

According to this embodiment, as hereinabove described, the mounting portion 13 of the liquid crystal module 10 is made of the metal and so formed that the front housing 2 of resin is deformed into the flat shape from the state warping in the recessed shape concaved rearward while the metallic mounting portion 13 of the liquid crystal module 10 remains undeformed when the metallic mounting portion 13 of the liquid crystal module 10 is fixed to the front housing 2 of resin. Thus, the mounting portion 13 of the liquid crystal module 10 is so made of the metal having higher rigidity than the resin that the same can be inhibited from deformation into a recessed shape concaved rearward in plan view due to repulsive force of the front housing 2 returning from the flat shape to the recessed shape concaved rearward in plan view when the liquid crystal module 10 is fixed to the front housing 2. Therefore, the flat shape of the front housing 2 can be more stably maintained when the liquid crystal module 10 is fixed to the front housing 2.

According to this embodiment, as hereinabove described, the front housing 2 is so formed as to warp in the recessed shape concaved rearward along the horizontal direction in plan view and so structured as to have the flat shape in plan view when the liquid crystal module 10 is fixed, whereby a liquid crystal television set 1 having a horizontally long front housing 2 capable of maintaining a flat shape can be obtained.

According to this embodiment, as hereinabove described, the bosses 16, 26, 36 and 46 provided on both ends and the central portions of the front housing 2 in the longitudinal direction and the bosses 6 provided on both ends and the central portion of the front housing 2 in the short-side direction have the same protrusive heights, whereby the contact surfaces of all bosses 6, 16, 26, 36 and 46 coming into contact with the mounting portion 13 can be located on substantially identical vertical positions when the liquid crystal module 10 is fixed to the front housing 2 and the front housing 2 is deformed into the flat shape. Thus, the flat shape of the front housing 2 can be stably maintained when the liquid crystal module 10 is fixed to the front housing 2.

Although the present invention has been described and illustrated in detail, it is clearly understood that the same is by way of illustration and example only and is not to be taken by way of limitation, the spirit and scope of the present invention being limited only by the terms of the appended claims.

For example, while the aforementioned embodiment is applied to the liquid crystal television set 1 employed as the exemplary display, the present invention is not restricted to this but may alternatively be applied to another display such as a liquid crystal monitor, so far as the same has a display panel such as a liquid crystal panel and a housing.

While the aforementioned embodiment is applied to the horizontal liquid crystal television set 1 having the horizontal longitudinal direction (direction X) as the exemplary display, the present invention is not restricted to this but may alternatively be applied to a vertical display having a vertical longitudinal direction.

While the liquid crystal module 10 having the liquid crystal panel 11 is employed as the exemplary display in the aforementioned embodiment, the present invention is not restricted to this but a module having another display panel such as an organic EL panel may alternatively be employed.

While the front housing 2 is so formed as to warp in the recessed shape concaved rearward along the horizontal direction, which is the longitudinal direction, in plan view in the aforementioned embodiment, the present invention is not restricted to this but the front housing 2 may alternatively be so formed as to warp in a recessed shape concaved rearward along the height direction, which is the short-side direction, in plan view.

What is claimed is:

1. A display comprising:
    a display portion for displaying images; and
    a housing mounted with a mounting portion of said display portion, wherein
    said housing is so formed as to warp in a recessed shape concaved rearward along the longitudinal direction in plan view, and so structured as to have a flat shape in plan view when said display portion is fixed,
    said housing includes boss portions coming into contact with said mounting portion of said display portion for mounting said display portion on said housing at least one by one on both end-sides of said housing and on a central-side of said housing in the longitudinal direction, and the protrusive heights of said boss portions of said housing are substantially equalized to each other.

2. The display according to claim 1, wherein
    said end-sides are end portions of said housing and said central-side is a central portion of said housing.

3. The display according to claim 2, wherein
    said boss portions of said housing have threaded holes,
    said display portion is fixed to said housing by fitting screw members into said threaded holes of said boss portions of said housing through said mounting portion, and
    said housing is deformed into said flat shape in plan view from the state warping in said recessed shape when said display portion is fixed to said housing by said screw members.

4. The display according to claim 1, wherein
    said housing is made of resin, and so formed by resin molding as to warp in said recessed shape concaved rearward along the longitudinal direction in plan view.

5. The display according to claim 4, wherein
    said mounting portion of said display portion is made of a metal, and so formed that said housing of resin is deformed into said flat shape from the state warping in said recessed shape concaved rearward while said metallic mounting portion of said display portion remains undeformed when said metallic mounting portion of said display portion is fixed to said housing of resin.

6. The display according to claim 1, wherein
    said housing includes an opening for exposing said display portion frontward and a protrusion so provided along said opening as to protrude rearward with respect to said display portion, and
    said protrusion of said housing is so formed as to separate from said mounting portion of said display portion when said display portion is fixed to said housing.

7. The display according to claim 1, wherein
    said housing is so formed as to warp in said recessed shape concaved rearward along the horizontal direction in plan view, and so structured as to have flat shape in plan view when said display portion is fixed.

8. The display according to claim 2, wherein
    said boss portions of said housing are provided at least one by one on said both end portions and said central portion of said housing in the longitudinal direction and also provided at least one by one on both end portions and a central portion of said housing in the short-side direction, and
    all said boss portions provided on said housing are so formed as to have substantially identical protrusive heights.

9. A liquid crystal television set comprising:
    a display portion for displaying images; and
    a housing mounted with a mounting portion of said display portion, wherein
    said housing is so formed as to warp in a recessed shape concaved rearward along the longitudinal direction in plan view, and so structured as to have a flat shape in plan view when said display portion is fixed,
    said housing includes boss portions coming into contact with said mounting portion of said display portion for mounting said display portion on said housing at least one by one on both end-sides of said housing and on a central-side of said housing in the longitudinal direction, and the protrusive heights of said boss portions of said housing are substantially equalized to each other.

10. A method of manufacturing a display, comprising steps of:
    forming a housing mounted with a mounting portion of a display portion displaying images to warp in a recessed shape concaved rearward along the longitudinal direction in plan view; and
    fixing said display portion to said housing so that said housing has a flat shape in plan view,
    said housing includes boss portions coming into contact with said mounting portion of said display portion for mounting said display portion on said housing at least one by one on both end-sides of said housing and on a central-side of said housing in the longitudinal direction, and the protrusive heights of said boss portions of said housing are substantially equalized to each other.

11. The method of manufacturing a display according to claim 10, wherein
    said housing includes boss portions coming into contact with said mounting portion of said display portion for mounting said display portion on said housing at least one by one on both end portions and a central portion of said housing in the longitudinal direction, and
    the protrusive heights of said boss portions of said housing are substantially equalized to each other.

12. The method of manufacturing a display according to claim 11, wherein
    said boss portions of said housing have threaded holes, and
    said step of fixing said display portion to said housing includes a step of deforming said housing into said flat shape in plan view from the state warping in said recessed shape concaved rearward by fitting screw members into said threaded holes of said boss portions of said housing through said mounting portion.

13. The method of manufacturing a display according to claim 10, wherein
    said step of forming said housing includes a step of forming said housing made of resin by resin molding to warp in said recessed shape along the longitudinal direction in plan view.

14. The method of manufacturing a display according to claim 13, wherein
said mounting portion of said display portion is made of a metal, and
said step of fixing said display portion to said housing includes a step of fixing said display portion to said housing so that said housing of resin is deformed into said flat shape in plan view from the state warping in said recessed shape concaved rearward without deforming said metallic mounting portion of said display portion.

15. The method of manufacturing a display according to claim 10, wherein
said housing includes an opening for exposing said display portion frontward and a protrusion so provided along said opening as to protrude rearward with respect to said display portion, and
said step of fixing said display portion to said housing includes a step of fixing said display portion to said housing so that said protrusion of said housing and said mounting portion of said display portion separate from each other.

16. The method of manufacturing a display according to claim 10, wherein
said step of forming said housing includes a step of forming said housing to warp in said recessed shape concaved rearward along the horizontal direction in plan view.

17. The method of manufacturing a display according to claim 11, wherein
said housing includes boss portions coming into contact with said mounting portion of said display portion for mounting said display portion on said housing at least one by one on both end portions and a central portion of said housing in the longitudinal direction, and
the protrusive heights of said boss portions of said housing are substantially equalized to each other.

* * * * *